United States Patent
Komatsubara et al.

(10) Patent No.: US 6,786,307 B2
(45) Date of Patent: Sep. 7, 2004

(54) PARKING BRAKE DEVICE

(75) Inventors: Masahiko Komatsubara, Saitama (JP); Hiroki Ishikawa, Saitama (JP); Masahiro Imamachi, Saitama (JP); Satoru Masuda, Kanagawa (JP); Shingo Hori, Kanagawa (JP); Hiroshi Tsukamoto, Kanagawa (JP); Tomoya Sugiyama, Kanagawa (JP)

(73) Assignees: Honda Giken Kogyo K.K., Tokyo (JP); Otsuka Koki K.K., Kanagawa-ken (JP)

( * ) Notice: Subject to any disclaimer, the term of this patent is extended or adjusted under 35 U.S.C. 154(b) by 0 days.

(21) Appl. No.: 10/216,874

(22) Filed: Aug. 13, 2002

(65) Prior Publication Data

US 2003/0042081 A1 Mar. 6, 2003

(30) Foreign Application Priority Data

Aug. 31, 2001 (JP) ........................ 2001-263208

(51) Int. Cl.⁷ ................................ G05G 1/04
(52) U.S. Cl. ........................ 188/2 D; 74/523
(58) Field of Search ............... 188/2 D, 24.22, 188/721, 72.3, 72.9, 73.1, 73.31, 73.35, 371, 377, 196 B, 196 BA, 196 M, 196 P; 74/523, 525, 535, 536, 528

(56) References Cited

U.S. PATENT DOCUMENTS

| | | | | |
|---|---|---|---|---|
| 3,964,340 A | * | 6/1976 | Antonio et al. ............ | 74/551.9 |
| 4,440,269 A | * | 4/1984 | Harriott ................... | 188/196 F |
| 4,515,036 A | * | 5/1985 | Dotson ..................... | 74/535 |
| 4,876,914 A | * | 10/1989 | Kanno ...................... | 74/538 |
| 5,842,933 A | * | 12/1998 | Lewis ....................... | 473/300 |
| 6,216,339 B1 | * | 4/2001 | Rich ......................... | 29/762 |
| 6,264,228 B1 | * | 7/2001 | Westervelt ................ | 280/428 |
| 6,389,928 B1 | * | 5/2002 | Kobayashi et al. ......... | 74/536 |
| 6,471,623 B1 | * | 10/2002 | Lin ........................... | 482/141 |

FOREIGN PATENT DOCUMENTS

| JP | 588835 A | * | 1/1983 |
|---|---|---|---|
| JP | 4283132 A | * | 10/1992 |

OTHER PUBLICATIONS

US 2002/0020242 A1 to Matsuno et al.*

US 2002/0062710 A1 to Komatsubara et al.*

* cited by examiner

*Primary Examiner*—Robert A. Siconolfi
(74) *Attorney, Agent, or Firm*—Takeuchi & Takeuchi

(57) ABSTRACT

A parking brake device which can not only better the safety, but also reduce the cost by simplifying the construction. A shock absorbing portion 35, 36 which resists an operating force in pulling a brake lever 30 toward the compartment and which is deformed by an impact force in the direction which is approximately opposite to the direction of pulling the brake lever 30 toward the compartment, absorbing the impact force is provided.

5 Claims, 9 Drawing Sheets

[FIG. 6]
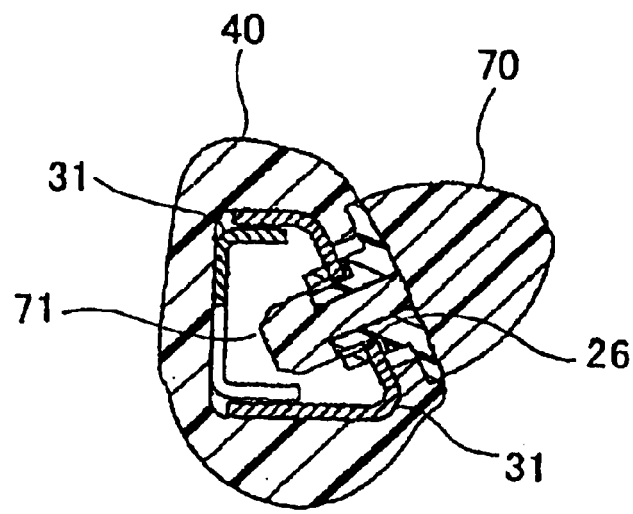
[FIG. 7]
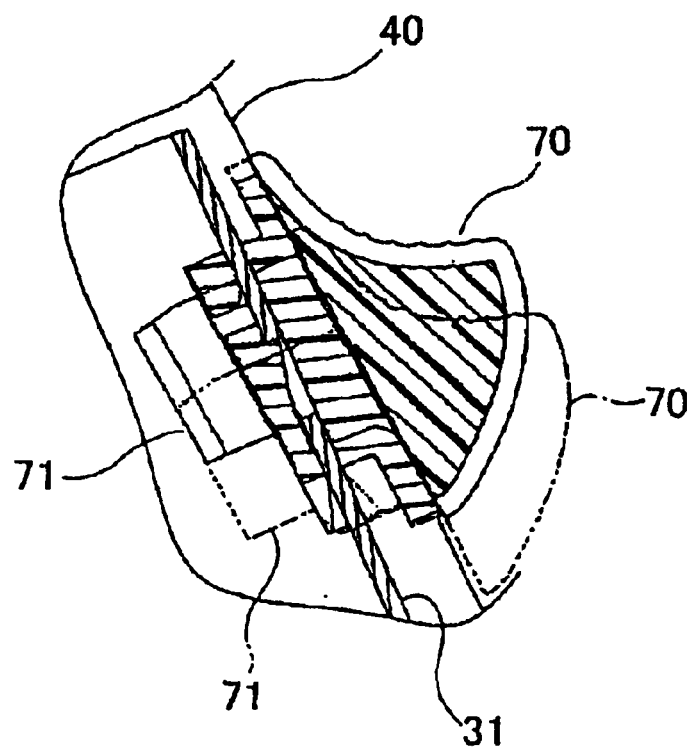

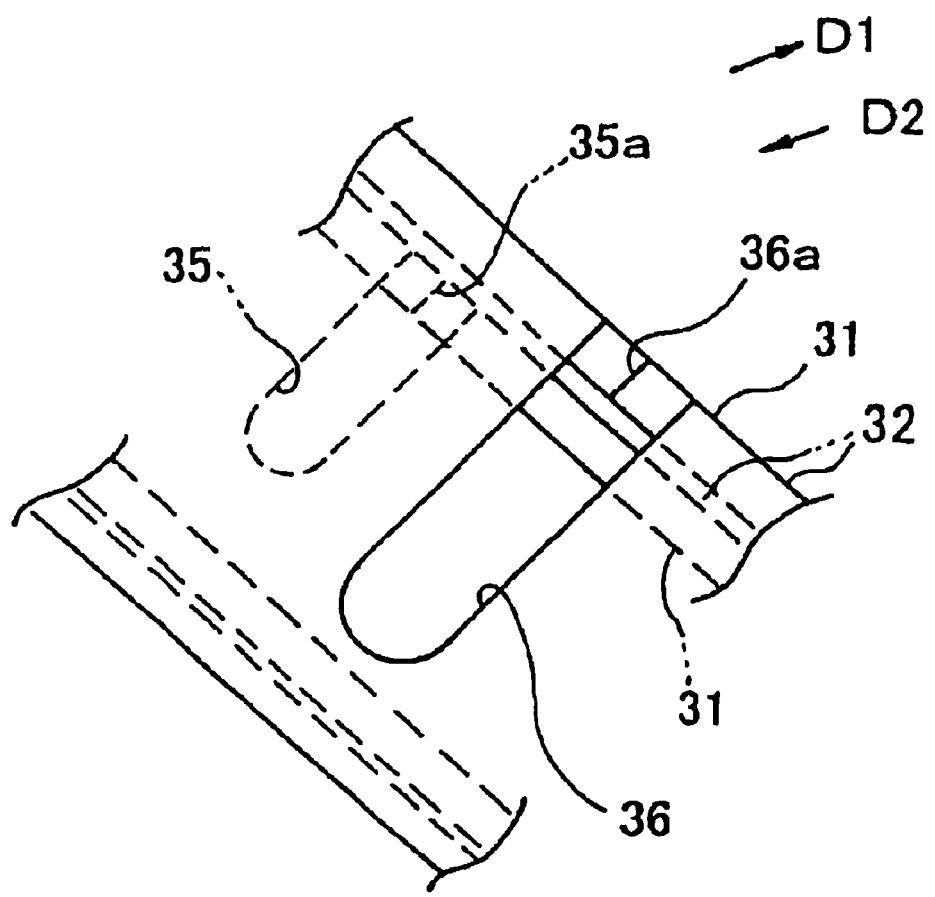
[FIG. 8]

[FIG. 9]
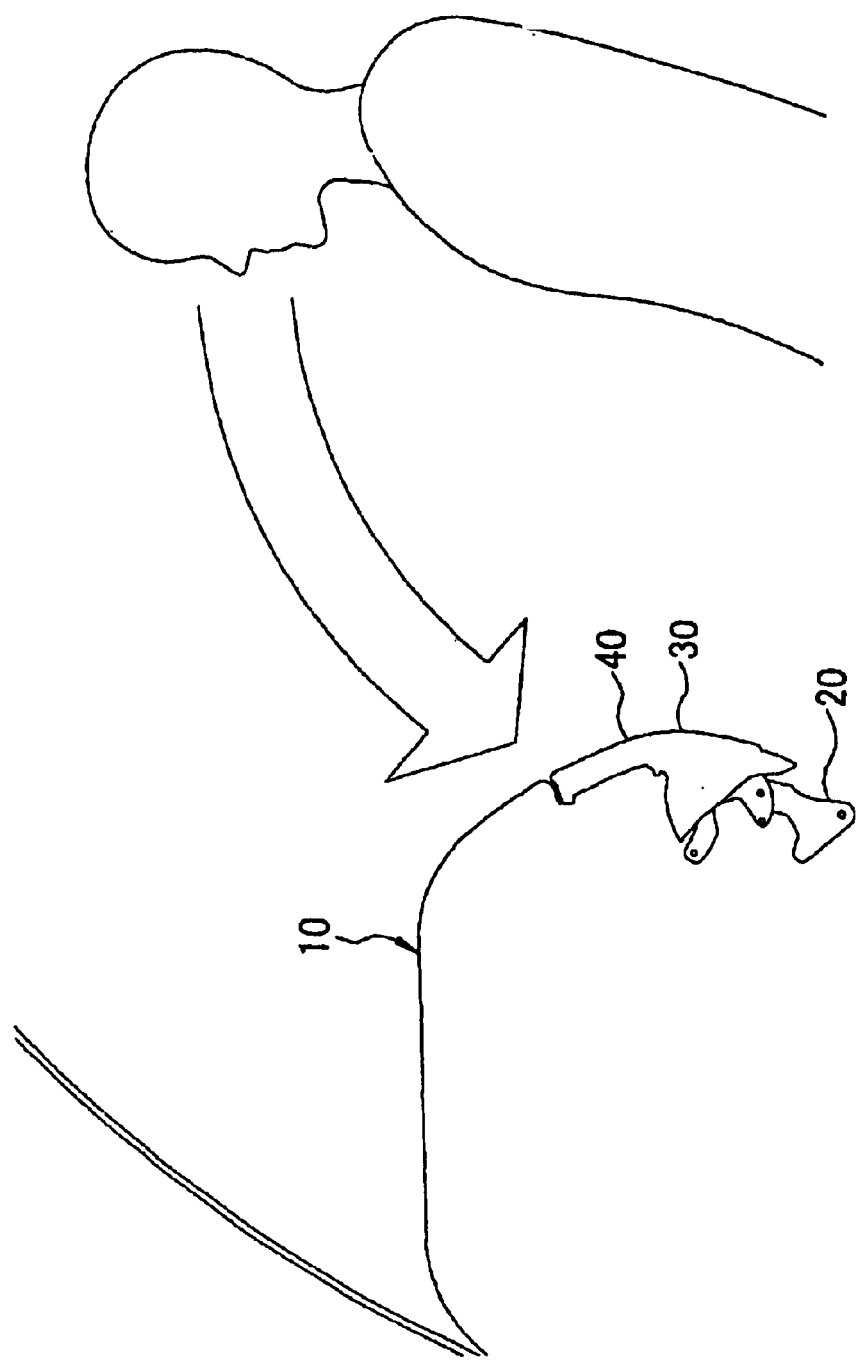

[FIG. 10]
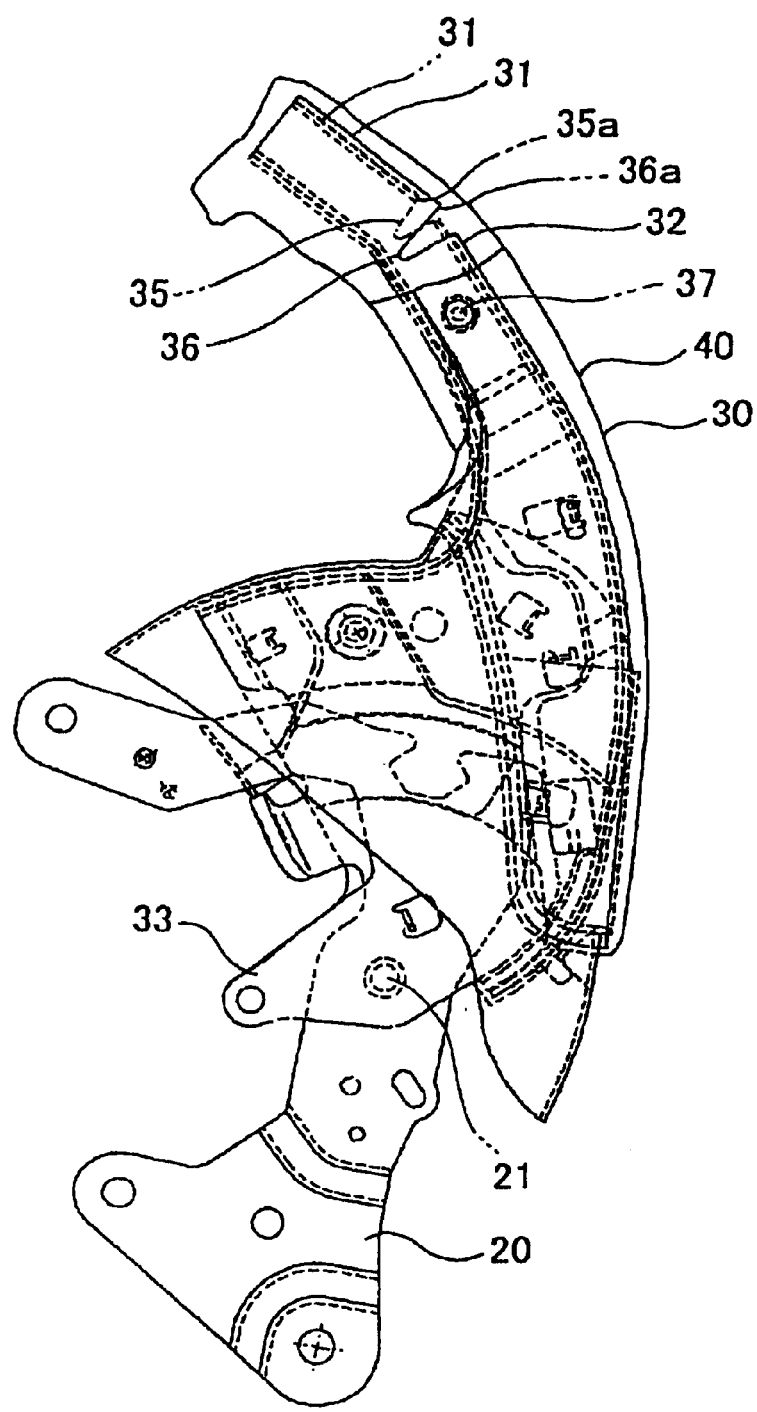

PARKING BRAKE DEVICE

FIELD OF THE INVENTION

The present invention relates to a parking brake device with which a brake lever is carried by an installation member such that it is capable of being turned between a release position and an actuating position, and by turning the brake lever from said release position to said actuating position, a force is transmitted to a braking portion through a brake wire for generation of a braking force.

BACKGROUND

Conventionally, as this type of parking brake device, a manual type parking brake device which brake lever is disposed in the vicinity of the driver's seat of a vehicle, and with which, by pulling up the brake lever from a thrown-down position to an actuating position, a force is transmitted to the braking portion through a brake wire for generation of a braking force is known. Such parking brake devices include an accommodation type one with which, after pulling up the brake lever to the actuating position, the brake lever is thrown down from the actuating position to the accommodation position while a desired braking force being maintained, thus a projection feeling in the compartment is eliminated with the fineness of the appearance being improved, and the roominess and safety being bettered.

Also, to effectively provide a feeling of harmony of the brake lever with the interior equipment in the compartment and thus improve the fineness of the appearance of the compartment inside, a certain type of parking brake device disposes the brake lever in the side edge portion of the console box formed in the middle of the instrument panel.

Thus, because the brake lever is also a piece of interior equipment to be provided in the compartment, a variety of contrivances for preventing the fineness of the appearance of the compartment inside from being impaired, and bettering the safety of the passengers have been given to it.

However, with the above stated accommodation type parking brake device, the brake lever must have a complicated motion of being thrown down into the accommodation position, thus there has arisen a problem of that the construction is intricate, resulting in the number of parts and the man-hours for assembling being increased, which leads to an increase in the cost.

The present invention has been carried out in consideration of the above-stated problem associated with the prior art, and is intended to provide a parking brake device which can not only better the safety, but also reduce the cost by simplifying the construction.

SUMMARY OF THE INVENTION

This purpose of the present invention can be achieved by:

[1] A parking brake device with which a brake lever (30) is carried by an installation member such that it is capable of being turned between a release position and an actuating position, and by pulling the brake lever (30) toward the compartment for turning it from said release position to said actuating position, a force is transmitted to a braking portion through a brake wire for generation of a braking force, wherein
a shock absorbing portion (35, 36) which resists an operating force in pulling said brake lever (30) toward the compartment, and which is deformed by an impact force in the direction (D2) which is approximately opposite to the direction (D1) of pulling said brake lever (30) toward the compartment, absorbing the impact force, is provided for said brake lever (30).

[2] A parking brake device with which a brake lever (30) is carried by an installation member such that it is capable of being turned between a release position and an actuating position, and by pulling the brake lever (30) toward the compartment for turning it from said release position to said actuating position, a force is transmitted to a braking portion through a brake wire for generation of a braking force, wherein
a lever body (31), which is the body of said brake lever (30), having a grip portion (32), and a grip (40) which covers the circumference of the grip portion (32) of the lever body (31), and
a shock absorbing portion (35, 36) which resists an operating force in pulling said brake lever (30) toward the compartment, and which is deformed by an impact force in the direction (D2) which is approximately opposite to the direction (D1) of pulling said brake lever (30) toward the compartment, absorbing the impact force, is provided for the grip portion (32) of said lever body (31).

[3] A parking brake device as stated in par. [1] or par. [2], wherein said shock absorbing portion (35, 36) is formed in the shape of a cutout slot which slot opening (35a, 36a) is closed, being disposed such that, when it is subjected to an operating force in pulling said brake lever (30) toward the compartment, the slot opening (35a, 36a) of said cutout slot is closed for resistance to the operating force, while being disposed such that, when it is subjected to an impact force in the direction (D2) which is approximately opposite to the direction (D1) in pulling said brake lever (30) toward the compartment, the slot opening (35a, 36a) of said cutout slot is opened for absorption of the impact force.

[4] A parking brake device as stated in par. [1], par. [2] or par. [3], wherein said shock absorbing portion (35, 36) is formed in the shape of a cutout slot which is recessed from one (32a) of both side edges of the body of said brake lever (30) or one (32a) of both side edges of the grip portion (32) of said lever body (31) that is located on said compartment side to the bother (32b) of said both side edges.

[5] A parking brake device as stated in par. [1], par. [2], par. [3] or par. [4], wherein the body of said brake lever (30) comprises a pair of lever bodies (31) which are combined with each other, and said shock absorbing portion (35, 36) is disposed in respective desired locations between the base end portion (33) of the lever body (31), which corresponds to the end portion of said brake lever (30) on the turning center side, and the top end portion of the lever body.

Next, the function of the invention as stated in the above respective paragraphs will be described.

The brake lever (30) is carried by a piece of interior equipment, such as a console box providing the front wall of a compartment, through an installation member such that it is rotatable.

By pulling the brake lever (30) toward the compartment to turn it from the release position to the actuating position, a force is transmitted to the braking portion through a brake wire for generation of a braking force. In this case, the shock absorbing portion (35, 36) resists to the operating force in pulling the brake lever (30) toward the compartment, thus the operability of the brake lever (30) will not be adversely affected. When the brake lever (30) is in the actuating position, said brake lever (30) can be constrained in the actuating position by means of a lock mechanism, for example.

When the brake lever (30) is constrained in the actuating position, operating the release knob, for example, to release it from the constraint by the lock mechanism, and, in order to turn the brake lever (30) from the actuating position to the release position, operating the brake lever (30) in the direction which is opposite to the direction (D1) in pulling it toward the compartment will cancel the braking force.

When the brake lever (30) is disposed on the console box or the like providing the front wall of the compartment, there is the possibility of the brake lever (30) being subjected to an impact force in the direction (D2) which is approximately opposite to the direction (D1) of pulling the brake lever (30), (hereafter abbreviated to an impact force), in the event of, for example, a front collision of the vehicle. Specifically, there is the possibility of something accommodated in the vehicle being collided with the brake lever (30), or in some case, the possibility of a passenger, including the driver, striking directly or indirectly against the brake lever (30).

The brake lever (30), which is the body of the brake lever (30), is provided with a lever body (31) having a grip portion (32), and a grip (40) covering the circumference of the grip portion (32) of that lever body (31).

With the brake lever (30) configured as stated above, the shock absorbing portion (35, 36) is provided in the grip portion (32) of the lever body (31). In other words, when something accommodated in the vehicle is collided with the grip (40), the impact force is applied to the grip portion (32), and it is absorbed by the shock absorbing portion (35, 36) which is provided in the grip portion (32). On the other hand, because the grip (40) is generally molded with the use of a soft plastic material, the grip (40) itself can absorb the impact force, and thus can prevent the things accommodated from being damaged, and secure the safety for the driver.

Specifically, the shock absorbing portion (35, 36) is formed in the shape of a cutout slot which slot opening (35a, 36a) is closed. The state in which the slot opening (35a, 36a) is closed is not limited to the completely closed state, but includes the slightly opened state.

Such shock absorbing portion (35, 36) can resist the operating force in pulling the brake lever (30) toward the compartment, because, when the brake lever (30) is pulled toward the compartment in order to turn it from the release position to the actuating position, for example, the operating force in the pulling is applied to the cutout slot, but the slot opening (35a, 36a) of the cutout slot is closed, and will not be deformed, or the slot opening (35a, 36a) which is slightly opened is slightly deformed, being closed, and will not be further deformed.

On the other hand, when the brake lever (30) is released from the constraint by the lock mechanism by means of the release knob, for example, in order to turn the brake lever (30) from the actuating position to the release position, for example, the brake lever (30) is returned from the actuating position to the release position by the energizing force, thus the operating force in the direction opposite to the compartment will not be applied to the cutout slot, or, if it is applied to the cutout slot, the operating force is slight, and thus the slot opening (35a, 36a) of the cutout slot will not be opened and deformed.

As stated above, operation for turning the brake lever (30) between the release position and the actuating position will not deform the shock absorbing portion (35, 36), which provides a cutout slot, thus the operability of the brake lever (30) being maintained.

When the impact force is applied to the cutout slot in the brake lever (30), resulting in a stress concentration occurring in the shock absorbing portion (35, 36), which provides a cutout slot, the slot opening (35a, 36a) of the cutout slot is opened to be deformed to the extent which varies depending upon the impact force, and thus the impact force is absorbed.

Such a cutout slot is recessed from one (32a) of both side edges of the body of the brake lever (30) or one (32a) of both side edges of the grip portion (32) of the lever body (31) that is located on the compartment side to the other (32b) of both side edges.

When an impact force is applied to the brake lever (30), a tensile force is applied to one (32a) of both side edges of the body of the brake lever (30) or one (32a) of both side edges of the grip portion (32) of the lever body (31) such that the brake lever (30) is deflected in the direction which is opposite to the direction toward the compartment. The tensile force acts so as to open the slot opening (35a, 36a) of the cutout slot which is formed on the side of said one side edge (32a), thus, with a slight impact force, the amount of opening of the slot opening (35a, 36a) of the cutout slot is small, while, with a greater impact force, the amount of opening is larger. In other words, the slot opening (35a, 36a) of the cutout slot is deformed to the degree of the impact force to absorb the impact force.

The body of the brake lever (30) is constructed by combining a pair of lever bodies (31) with each other, and when the pair of lever bodies (31) is provided with a shock absorbing portion (35, 36), respectively, the degree of impact force which can be absorbed by the shock absorbing portion (35, 36) varies depending upon the geometry of the shock absorbing portion (35, 36) and the like, however, it is greatly affected by the location where the shock absorbing portion (35, 36) is disposed.

By disposing the shock absorbing portion (35, 36) in a desired location, respectively, between the base end portion (33) of the lever body (31), which corresponds to the end portion of the brake lever (30) on the turning center side, and the top end portion of the lever body (31), the degree of impact force which can be absorbed can be adjusted.

In other words, if the respective shock absorbing portions (35 and 36) are provided such that they are overlapped one upon another, a slight impact force can be absorbed, the amount of the force varying with the degree of overlapping, while, by providing the respective shock absorbing portions (35 and 36) such that they are separated, a greater impact force can be absorbed, the amount of the force varying with the degree of separation.

BRIEF DESCRIPTION OF THE DRAWINGS

FIG. 6 is a sectional view as taken along the line VI—VI in FIG. 1;

FIG. 7 is a sectional view as taken along the line VII—VII in FIG. 1;

FIG. 8 is a partial enlarged front view of a pair of lever bodies according to one embodiment of the present invention;

FIG. 9 is a side view of the brake lever according to one embodiment of the present invention in a mounting condition that is shown, being returned to a release position; and FIG. 10 is a side view of the parking brake device according to one embodiment of the present invention in a condition in which the slot openings of the cutout slots, which provide a shock absorbing portion.

BEST MODES FOR CARRYING OUT THE INVENTION

Hereinbelow, an embodiment of the present invention will be described with reference to the drawings.

Figure 1:
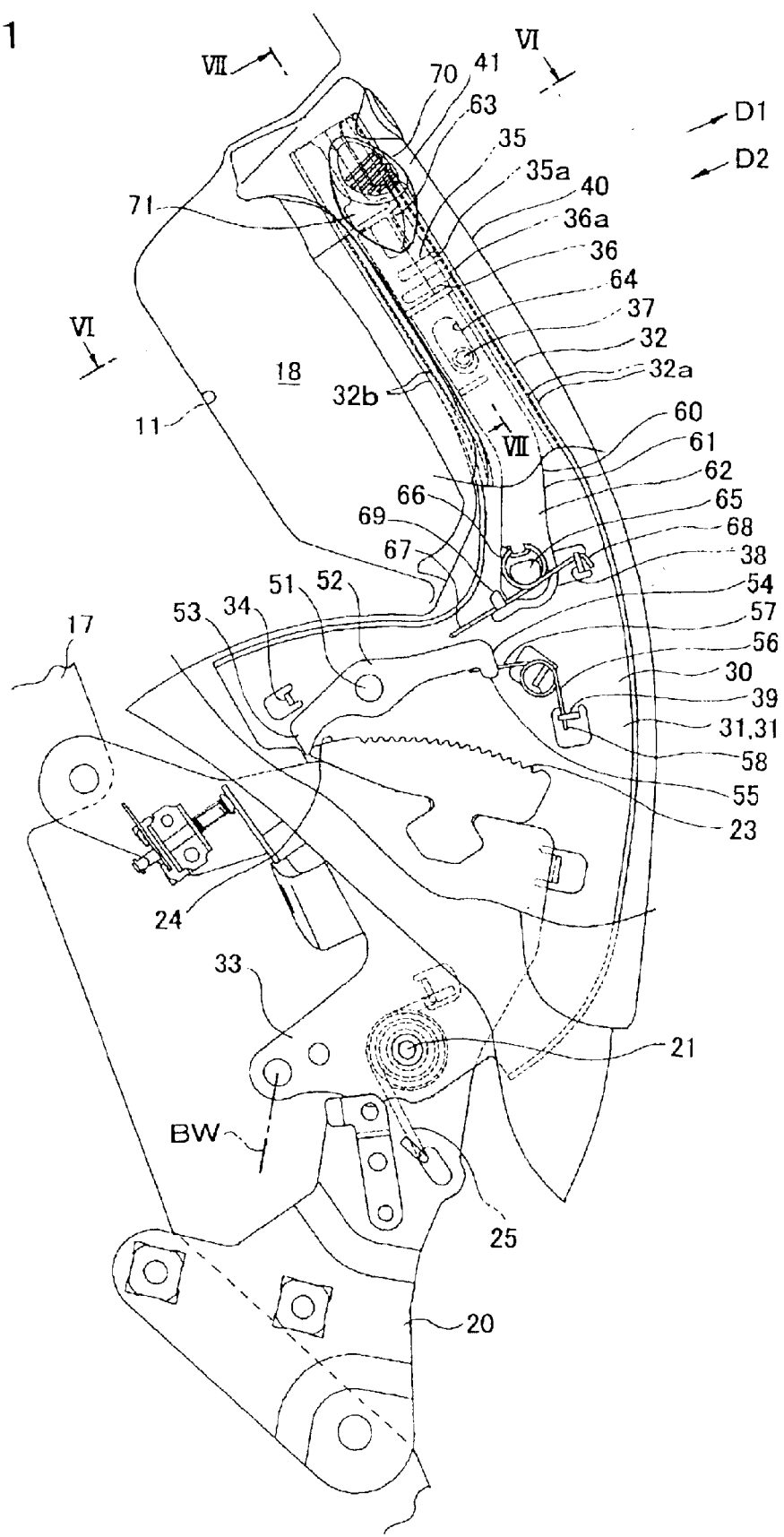
FIG. 1 is a sectional view as taken along the line I—I in FIG. 5.
Figure 2:
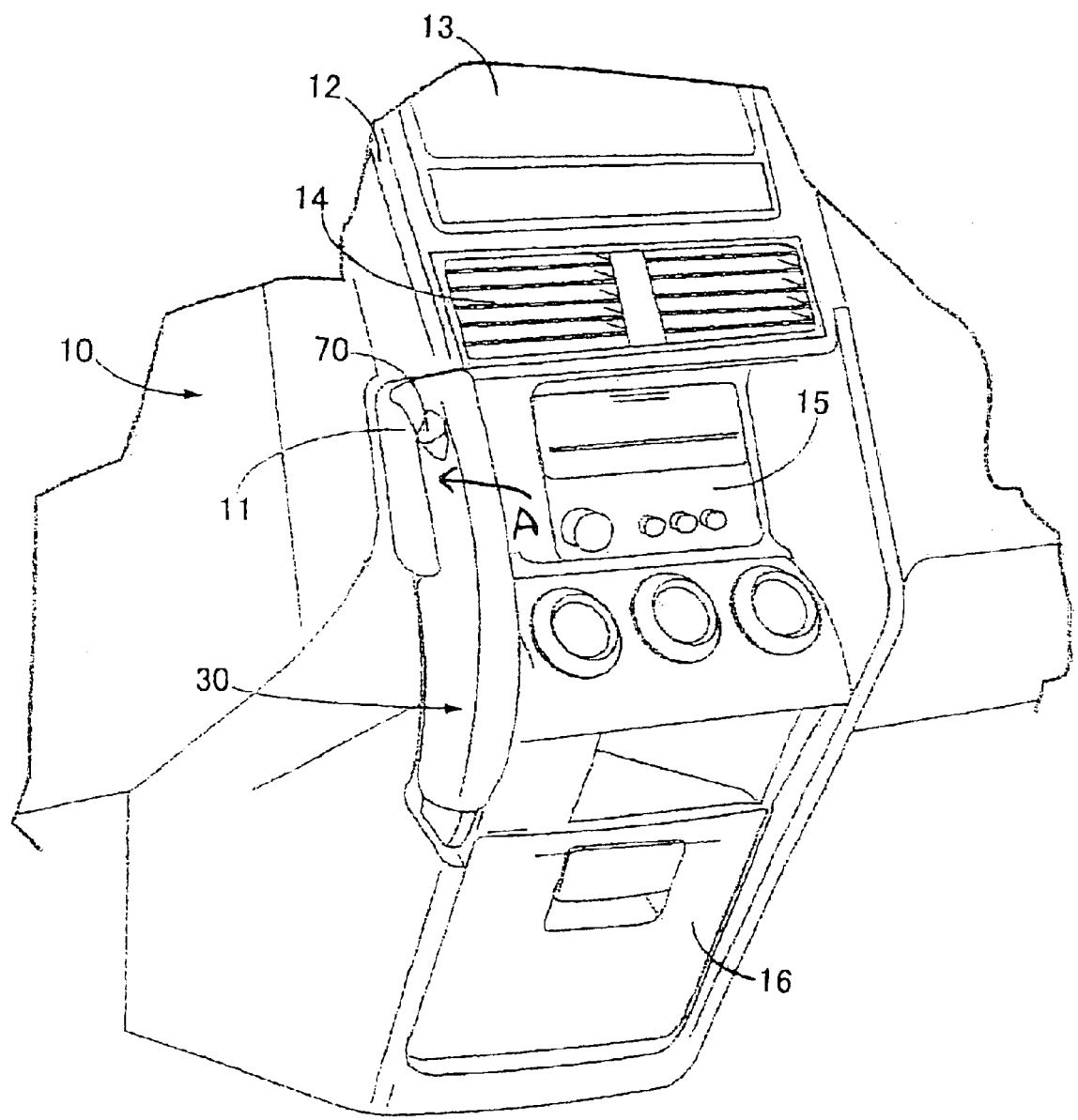
FIG. 2 is a perspective view of the brake lever according to one embodiment of the present invention in a mounting condition that is shown, being returned to a release position.
Figure 3:
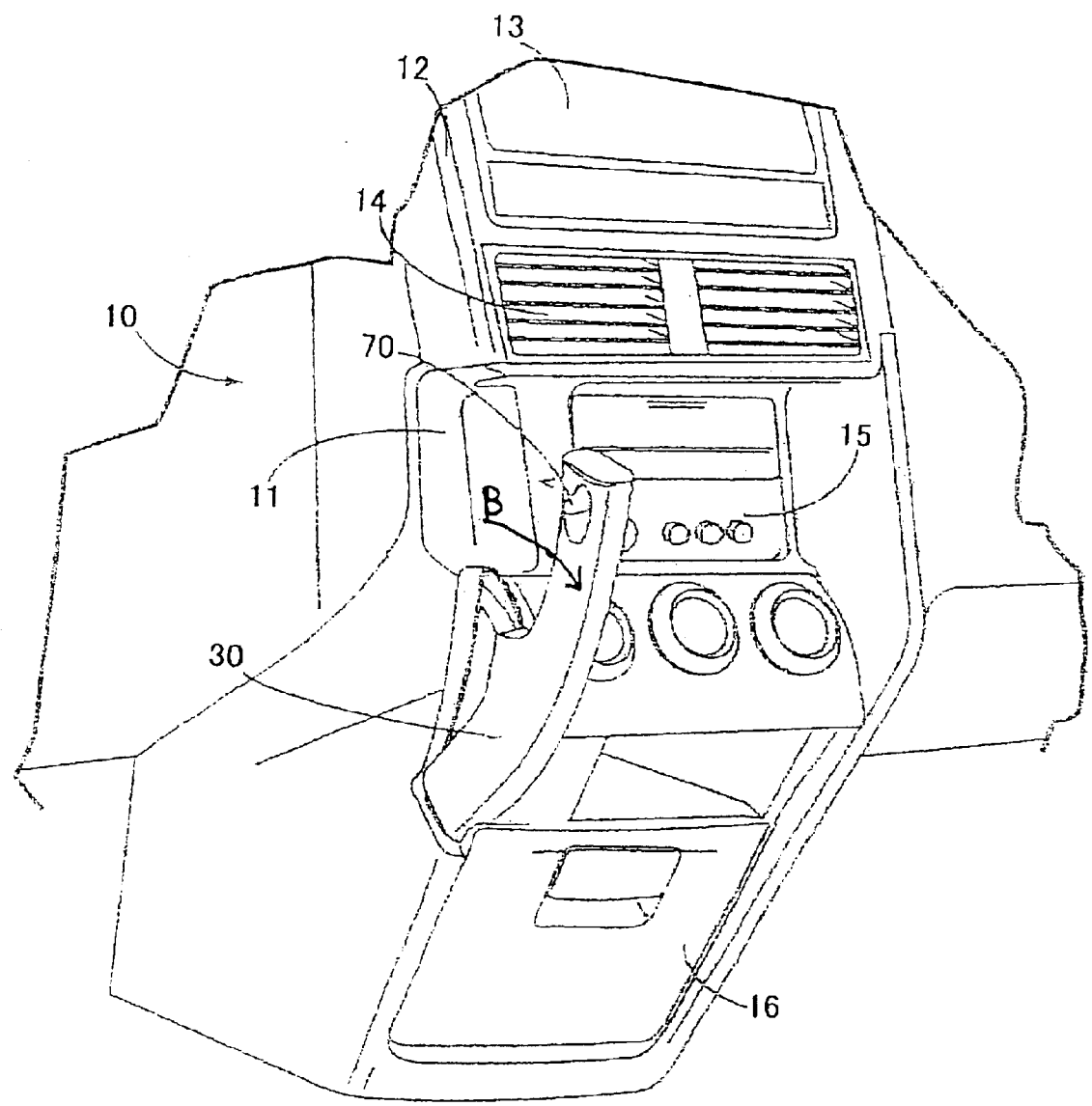
FIG. 3 is a perspective view of the brake lever according to one embodiment of the present invention in a mounting condition that is shown, being turned to an actuating position.
Figure 4:
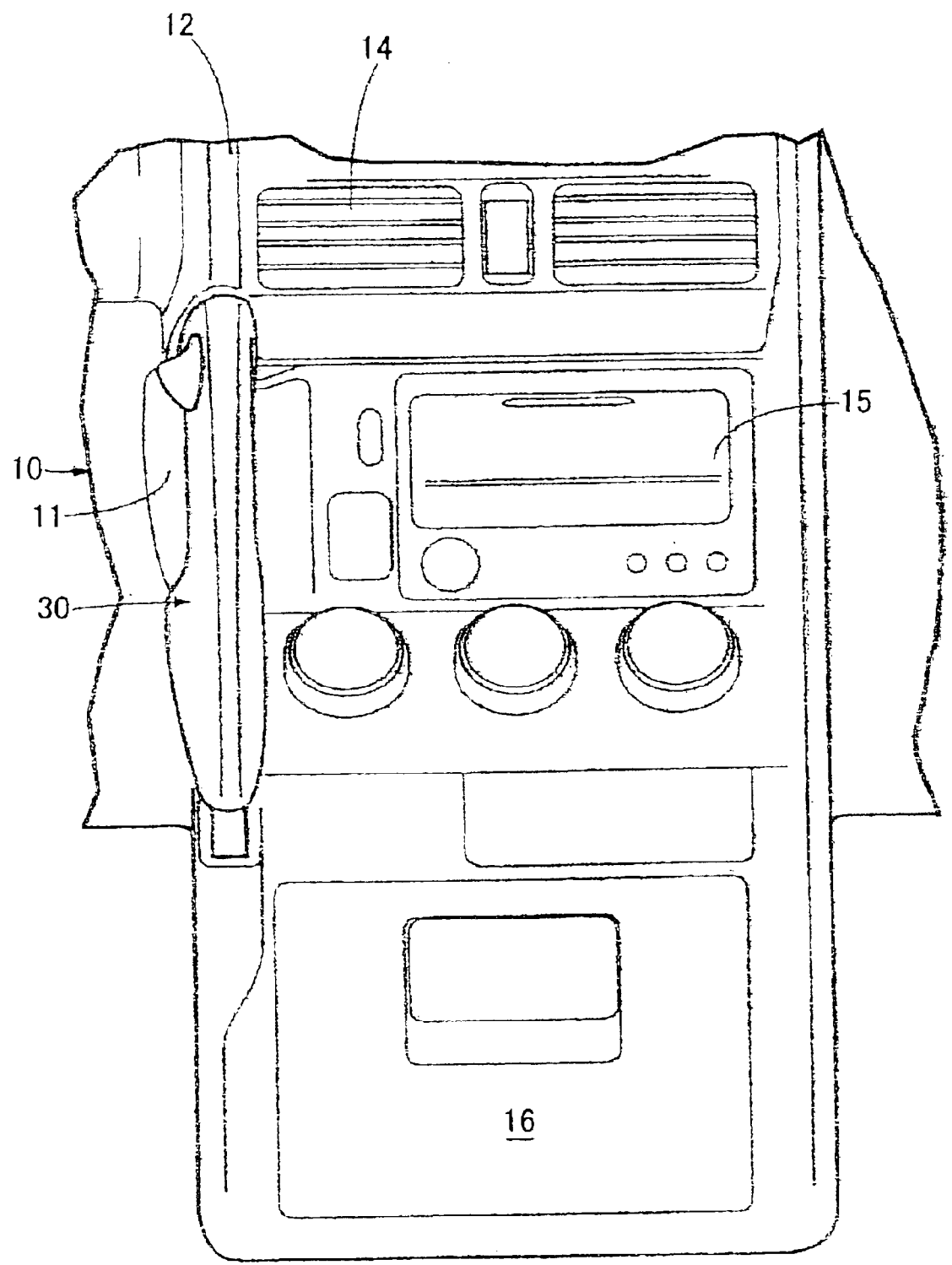
FIG. 4 is a front view of FIG. 2.
Figure 5:
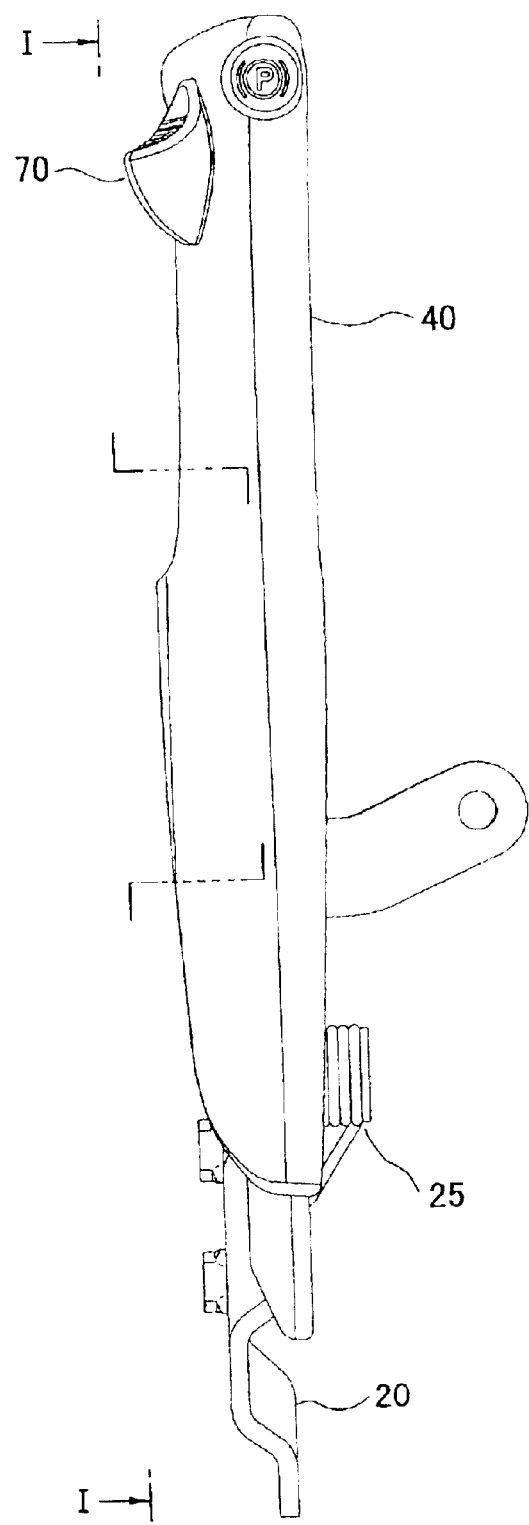
FIG. 5 is a front view of the brake lever according to one embodiment of the present invention.

As shown in FIG. 1 to FIG. 4, a console box 12 formed in the central portion of an instrument panel 10 of vehicle is equipped with a car navigation 13, an air outlet grill for air conditioning 14, an audio apparatus 15, a small article compartment 16 and the like. At the side edge (the left side edge in the example shown) of the console box 12 on the driver's seat side, a brake lever 30 of a parking brake device is provided. This brake lever 30 can be turned between the release position A (the condition as shown in FIG. 2) where the brake lever is accommodated in a recess 11 in the shape of a cutout that is formed at the side edge of the console box 12 on the driver's seat side, and the actuating position B (the condition as shown in FIG. 3) where the brake lever gets out of the recess 11.

As shown in FIG. 1 to FIG. 6, the body of the brake lever 30 is made of a steel plate, consisting of a pair of lever bodies 31 which are combined with each other to provide a hollow grip portion 32, and a grip 40 which is made of a synthetic resin, covering the circumference of the grip portion 32. The base end portion 33 of the lever body 31 penetrates the front wall of the console box 12 to reach the inside thereof, being mounted, through a pivot 21, to a bracket 20 anchored to a frame 17 for supporting an instrument panel 10. A coil spring 25 coiled around the pivot 21 energizes the brake lever 30 in the direction toward the release position A. A brake wire BW which is connected to an operation lever (not shown) is connected with the base end portion 33 of the lever body 31.

On said bracket 20, a sectorial ratchet gear 23 and a plain surface 24 connected to one end of this ratchet gear 23 are formed around the center of the pivot 21, and a ratchet pawl 52 having a pawl portion 53 at one end that can be engaged with those in sequence is rotatably mounted to the lever body 31 through a pivot 51. The pawl portion 53 is engaged with the plain surface 24 in the release position A of the brake lever 30, and with the tooth anywhere in the row of the teeth of the ratchet gear 23 in the actuating position B.

The ratchet pawl 52 is energized by a first energizing member 56 in such a direction that the pawl portion 53 thereof is engaged with the ratchet gear 23. A one-end portion 57 of the first energizing member 56 is anchored to a hook portion 55 formed in an other-end portion 54 of the ratchet pawl 52, and an other-end portion 58 of the first energizing member 56 is anchored to a hook portion 39 formed in the lever body 31.

Toward the other-end portion 54 of the ratchet pawl 52, a rear end portion 62 of a release rod 61 of a release mechanism 60 accommodated in the grip portion 32 of the lever body 31 is extended, and around a shaft portion 65 formed in the rear end portion 62 of the release rod 61, a second energizing member 66 is coiled. An oval hole 64 is formed in the middle portion of the release rod 61. In the oval hole 64, a pin member 37 is fitted such that it can be relatively moved, and by the pin member 37, the release rod 61 is supported such that it can be moved to be guided between the release position where the pawl portion 53 is disengaged from the ratchet gear 23 and the non-release position where the pawl portion 53 is engaged with the ratchet gear 23.

A one-end portion 67 of the second energizing member 66 is extended to near the other-end portion 54 of the ratchet pawl 52. In release operation, the ratchet pawl 52 is energized in such a direction that the pawl portion 53 thereof is disengaged by the one-end portion 67 of the second energizing member 66 that can be elastically contacted with the other-end portion 54.

The portion of the second energizing member 66 that extends from the coiled portion thereof to the one-end portion 67 is anchored in a hook portion 69 formed in the release rod 61. Further, the other-end portion 68 of the second energizing member 66 is anchored in a hook portion 38 formed in the lever body 31. Thereby, the second energizing member 66 energizes the release rod 61 obliquely upward in FIG. 1 (in the direction in which the one-end portion 67 of the second energizing member 66 is moved away from the other-end portion 54 of the ratchet pawl 52), while supporting the rear end portion 62 of the release rod 61 such that it is lifted from the lever body 31.

As shown in FIG. 1, FIG. 6 and FIG. 7, on the side face of the grip portion 32 on the driver's seat side, a guide member 80 which is embedded in the grip 40 is fixed, and to this guide member 80, a release knob 70 is loaded such that it can be slid in the axial direction of the release rod 61. The release knob 70 is provided with a pressing piece 71 which penetrates through a hole 26 provided in the side wall of the grip portion 32 to contact a front end portion 63 of the release rod 61.

Said recess 11 of the console box 12 which accommodates the brake lever 30 in the release position A thereof is opened at the side on the driver's seat side and at the rear on the car body rear side, therefore, the release knob 70 is disposed on the side face of the grip 40 that corresponds to the open side of the recess 11. Together with this, the gap between the head of the grip 40 and the upper end wall of the recess that corresponds thereto is so small that it can allow only turning of the brake lever 30 with no interference by the release knob 70. Between the side wall and bottom wall of the recess 11 and the grip 40, a space 18 which allows the driver's hand to be inserted for gripping the grip 40 is provided.

FIG. 8 is a partial enlarged front view of a pair of lever bodies according to one embodiment of the present invention.

As shown in FIG. 1 and FIG. 8, the brake lever 30 is provided with a shock absorbing portion 35, 36. Specifically, the shock absorbing portion 35, 36 is each disposed in the desired location in the pair of grip portions 32. The shock absorbing portion 35, 36 is formed in the shape of a cutout slot, and when the brake lever 30 is pulled toward the compartment, the slot opening 35a, 36a of the cutout slot, which is closed with the opening edges of the slot opening 35a, 36a butting each other, resists the operating force in pulling the brake lever 30 toward the compartment, while, when the brake lever 30 is subjected to an impact force in the direction (the direction D2 in FIG. 1 and FIG. 8) which is approximately opposite to the direction of pulling the brake lever 30 (the direction D1 in FIG. 1 and FIG. 8), the slot opening 35a, 36a of the cutout slot is deformed to open, resulting in the impact force being absorbed. Hereinafter, when the term "impact force" is used in the present embodiment, it refers to an impact force in the direction D2 which is approximately opposite to the direction D1 of pulling the brake lever 30.

Further, particularly, the shock absorbing portion 35, 36 is formed in the shape of a cutout slot which is recessed from one of both side edges of the grip portion 32 of the lever body 31 that is located on said compartment side (the right side edge in FIG. 1) to the other of said both side edges (the left side edge in FIG. 1).

Further, the respective shock absorbing portions 35 and 36 are disposed in the respective desired locations between the base end portion 33 of the lever body 31, which corresponds to the end portion of the brake lever 30 on the turning center (pivot 21) side, and the top end portion of the lever body 31, and for the respective shock absorbing portions 35 and 36, which provide a cutout slot, the degree of impact force which can be absorbed can be adjusted by changing the geometry, such as the slot width and the slot depth, however, simply by separating the specified locations of the shock absorbing portions 35 and 36 from each other by a certain amount, the degree of impact force which can be absorbed can be adjusted. In the present embodiment, the shock absorbing portions 35 and 36 are approx. 10 mm apart from each other.

Next, the action of the present embodiment will be described.

As shown in FIG. 1 and FIG. 2, when the brake lever 30 is in the release position A, it is accommodated in the recess 11 in the shape of a cutout of the console box 12. The pawl portion 53 of the ratchet pawl 52 is engaged with the plain surface 24. The release rod 61 is in the non-release position, and the one-end portion 67 of the second energizing member 66 provided in the rear end portion 62 of the release rod 61 is away from the other-end portion 54 of the ratchet pawl 52, with the ratchet pawl 52 being energized in a counterclockwise direction in FIG. 1 by the first energizing member 56.

When the brake lever 30 in the release position A is pulled toward the compartment against the reaction force from the brake wire BW and the energizing force of the coil spring 25, being turned from the release position A to the actuating position B, the pawl portion 53 of the ratchet pawl 52 is moved from the plain surface 24 to the ratchet gear 23, being engaged with the teeth of the ratchet gear 23 in sequence by the energizing force of the first energizing member 56, and in the actuating position B, being engaged with the tooth anywhere in the row of the teeth of the ratchet gear 23. Thereby, the brake lever 30 is constrained in the actuating position.

When the brake lever 30 is constrained in the actuating position, the brake wire BW is withdrawn, which results in a braking force being generated in the braking portion (not shown).

When the brake lever 30 is constrained in the actuating position, further pulling the brake lever 30 toward the compartment for carrying out a first operation will reduce the friction force between the pawl portion 53 of the ratchet pawl 52 and the ratchet gear 23. Then by carrying out a second operation consisting of pressing the front end portion 63 of the release rod 61 by means of the release knob 70 against the energizing force of the second energizing member 66 for moving the release rod 61 from the non-release position to the release position, the one-end portion 67 of the second energizing member 66 is elastically contacted with the other-end portion 54 of the ratchet pawl 52, which resulting in the ratchet pawl 52 being turned in a clockwise direction in FIG. 1, because the elastic force applied to the other-end portion 54 of the ratchet pawl 52 is greater than said reduced friction force and the energizing force of the first energizing member 56, and thus the pawl portion 53 of the ratchet pawl 52 is disengaged from the ratchet gear 23. Thereby the brake lever 30 is released from the constraint.

Then, by utilizing the energizing force of the coil spring 25 and the returning force of the brake wire BW for operating the brake lever 30 in the direction D2 which is opposite to the direction D1 of pulling it toward the compartment, the brake lever 30 is turned from the actuating position B to the release position A with the brake wire BW being withdrawn, and thus the braking force being cancelled. After returning the brake lever 30 to the release position A, stopping the operation of the release knob 70 will cause the release rod 61 to return to the non-release position from the release position by the energizing force of the second energizing member 66, the one-end portion 67 of the second energizing member 66 to be separated from the other-end portion 54 of the ratchet pawl 52, and the pawl portion 53 of the ratchet pawl 52 to be engaged with the plain surface 24 as in the original state.

When, as in the present embodiment, the brake lever 30 is disposed on the console box 12 or the like providing the front wall of the compartment, there is the possibility of the brake lever 30 being subjected to an impact force in the direction D2 which is approximately opposite to the direction D1 of pulling the brake lever 30, in the event of, for example, a front collision of the vehicle. Specifically, there is the possibility of something accommodated in the vehicle being collided with the brake lever 30, or in some case, the possibility of a passenger, including the driver, striking directly or indirectly against the brake lever 30.

With the present embodiment, the brake lever 30 is provided with a lever body 31 having a grip portion 32, and a grip 40 covering the circumference of the grip portion 32 of that lever body 31, therefore, there is the possibility of something accommodated in the vehicle being collided with the grip 40. When something accommodated in the vehicle is collided with the grip 40, the impact force will be absorbed by the shock absorbing portion 35, 36 provided in the grip portion 32 of the lever body 31.

On the other hand, if the grip 40 is molded with the use of a soft plastic material, the grip 40 itself can absorb the impact force.

For the shock absorbing portion 35, 36 which is formed in the shape of a cutout slot which slot opening is closed, description will be given more specifically.

With such a shock absorbing portion 35, 36, when the brake lever 30 is pulled toward the compartment to be turned from the release position A to the actuating position B, the operating force in the pulling is applied to the shock absorbing portion 35, 36, which provides a cutout slot. The operating force acts in the direction of closing the slot opening 35a, 36a of the cutout slot. Because the shock absorbing portion 35, 36 is formed in the shape of a cutout slot which slot opening 35a, 36a is closed with the opening edges of the slot opening 35a, 36a of the cutout slot butting each other, the slot opening 35a, 36a of the cutout slot will not be further closed, and opened, thus the shock absorbing portion 35, 36 being not deformed. In other words, the shock absorbing portion 35, 36 can sufficiently resist the operating force in pulling the brake lever 30 toward the compartment.

On the other hand, when the brake lever 30 is in the actuating position B, releasing the brake lever 30 from the constraint by means of the release knob 70 in order to turn the brake lever 30 from the actuating position B to the release position A will allow the energizing force to return the brake lever 30 from the actuating position B to the release position A, which means that the force required for operating the brake lever 30 in the direction D2 which is approximately opposite to the direction D1 of pulling the brake lever 30 is small, and with such a small operating force, the slot opening 35a, 36a of the shock absorbing portion 35, 36 will not be opened, and the shock absorbing portion 35, 36 will not be deformed.

As stated above, operation for turning the brake lever 30 between the release position A and the actuating position B will not deform the shock absorbing portion 35, 36, which provides a cutout slot, thus the operability of the brake lever 30 being maintained, however, when, in a front collision of the vehicle, for example, something accommodated in the vehicle being collided with the brake lever 30 from the direction D2 which is approximately opposite to the direction D1 of pulling the brake lever 30 toward the compartment, resulting in an impact force being applied to the brake lever 30, the shock absorbing portion 35, 36, which provides a cutout slot, will act as follows:

FIG. 9 is a side view of the brake lever in a mounting condition that is shown, being returned to a release position, and FIG. 10 is a side view of the parking brake device in a condition in which the slot openings of the cutout slots, which provide a shock absorbing portion, are opened.

As shown in FIG. 9, there is the possibility of that the inertia of a front collision of the vehicle or the like causes the driver to be moved from the driver's seat in the compartment toward the brake lever (in the direction D2 which is approximately opposite to the direction D1 of pulling the brake lever toward the compartment), and collided with the brake lever. If the driver is caused to strike against the brake lever, resulting in an impact force in the direction D2 which is approximately opposite to the direction D1 of pulling the brake lever toward the compartment being applied to the brake lever 30, a stress concentration occurs in the shock absorbing portion 35, 36, which provides a cutout slot, and as shown in FIG. 10, the slot opening 35a, 36a of the cutout slot is opened to be deformed. The slot opening 35a, 36a of the cutout slot is deformed, being opened to the extent which varies depending upon the impact force. Thereby, the impact force can be absorbed.

In the present embodiment, the shock absorbing portion 35, 36, which provides a cutout slot, is recessed from one 32a of both side edges of the respective grip portions 32 of the pair of lever bodies 31, that is located on the compartment side, to the other 32b.

When an impact force in the direction D2 which is approximately opposite to the direction D1 of pulling the brake lever toward the compartment is applied to the brake lever 30, a tensile force is applied to one 32a of both side edges of the grip portion 32 of the lever body 31 such that the brake lever 30 is deflected in the direction D2 which is opposite to the direction toward the compartment. The tensile force acts so as to open the slot opening 35a, 36a of the cutout slot which is recessed from one side edge 32a to the other side edge 32b, thus, with a slight impact force, the amount of opening of the slot opening 35a, 36a of the cutout slot is small, while, with a greater impact force, the amount of opening is larger. In other words, the slot opening 35a, 36a of the cutout slot is opened to the degree of the impact force to absorb the impact force.

Further, in the present embodiment, by combining a pair of lever bodies 31 with each other, the body of the brake lever 30 is constructed, and the pair of lever bodies 31 is provided with a shock absorbing portion 35, 36, respectively.

The degree of impact force which can be absorbed by the shock absorbing portion 35, 36 varies depending upon the slot width and slot depth of the shock absorbing portion 35, 36 and the like, however, it is greatly affected by the location where the shock absorbing portion 35, 36 is disposed. By disposing the shock absorbing portion 35, 36 in a desired location, respectively, between the base end portion 33 of the lever body 31, which corresponds to the end portion of the brake lever 30 on the pivot 21 (turning center) side, and the top end portion of the lever body 31, the degree of impact force which can be absorbed can be adjusted. In the present embodiment, the respective shock absorbing portions 35 and 36 are provided approx. 4 to 5 mm apart from each other such that a certain degree of impact force can be absorbed. By providing the respective shock absorbing portions 35 and 36 such that they are further separated, a greater impact force can be absorbed, thus the amount of the force varying with the degree of separation. On the other hand, if the respective shock absorbing portions 35 and 36 are provided such that they are overlapped one upon another instead of being separated from each other, a slight impact force can be absorbed. To what degree the respective shock absorbing portions 35 and 36 are to be separated from each other is determined in consideration of the rigidity of the pair of lever bodies 31 and the grip 40.

In the present embodiment, the shock absorbing portion 35, 36, which provides a slot opening 35a, 36a of a cutout slot, is closed, however, being not limited to this, the slot opening 35a, 36a of the cutout slot may be slightly opened, and when pulling the brake lever 30, the slot opening 35a, 36a of the cutout slot may be deformed until it is closed, resisting the operating force in pulling the brake lever 30 toward the compartment, while, when being subjected to an impact force in the direction D2 which is approximately opposite to the direction D1 of pulling the brake lever 30, the slot opening 35a, 36a of the cutout slot may be deformed so as to be further opened, resulting in the impact force being absorbed.

Further, the slot opening of the cutout slot is closed by causing the opening edges of the slot opening to butt each other, however, the slot opening may be closed by means of another member. In other words, when the cutout slot is subjected to the operating force in pulling the brake lever 30 toward the compartment, another member provided in the gap at the slot opening of the cutout slot may act so as to prevent the deformation of the cutout slot, thus resisting the operating force, while, when an impact force is applied to the cutout slot, the member allows the cutout slot to be deformed, and thus the impact force to be absorbed. Thus, another member to be provided as a spacer in the gap at the slot opening of the cutout slot may be formed as an integral part of the grip 40.

Further, the shock absorbing portion 35, 36, which provides a cutout slot, has a specified slot width of approx. 4 to 5 mm, however, it may have no slot width. In other words, the lever body 31 may be sheared from one of both side edges to the other.

Further, in the present embodiment, a pair of lever bodies 31 is provided with one shock absorbing portion 35, 36, respectively, however, it may be provided with two or more.

INDUSTRIAL APPLICABILITY

The parking brake device according to the prevent invention is simply constructed by providing a shock absorbing portion which resists the operating force in pulling the brake lever toward the compartment, and which is deformed with an impact force in the direction which is approximately opposite to the direction of pulling the brake lever, and thus it allows a higher safety to be given with the cost being reduced.

Particularly, the parking brake device has such a simple construction that the shock absorbing portion is formed in the shape of a cutout slot, and when the cutout slot is subjected to the operating force in pulling the brake lever toward the compartment, the slot opening of the cutout slot will not be opened, thus resisting the operating force, while, when the cutout slot is subjected to an impact force, it is opened to absorb the impact force in the direction which is approximately opposite to the direction of pulling the brake lever, thus there is no need for newly providing a special part or mechanism and the cost can be reduced.

What is claimed is:

1. A parking brake device comprising:

a brake lever supported by a bracket such that said brake lever is rotatable between a release position and an actuating position, said brake lever generating a braking force when an operating force in a direction toward a passenger compartment is applied to said brake lever so as to rotate said brake lever from said release position to said actuating position; and at least one shock absorbing portion provided in said brake lever and resisting said operating force, wherein said shock absorbing portion of said brake lever has such an internal structure that when an impact force in a direction substantially opposite to said direction of said operating force is applied to said shock absorbing portion at said released position, said shock absorbing portion is deformed to absorb said impact force.

2. The parking brake device according to claim 1, wherein said brake lever comprises a grip portion and said at least one shock absorbing portion is provided in said grip portion.

3. The parking brake device according to claim 1 or 2, wherein said at least one shock absorbing portion is formed in a shape of a cutout slot with a slot opening such that when said operating force is applied to said brake lever, said slot opening is closed to resist said operating force, and when said impact force is applied to said brake lever, said slot opening is opened to absorb said impact force.

4. The parking brake device according to claim 1 or 2, wherein said at least one shock absorbing portion is formed in a shape of cutout slot which is recessed from one of side edges of said brake lever to the other of said side edges of said brake lever, said one of side edges being located on a passenger compartment side.

5. The parking brake device according to claim 1 or 2, wherein said brake lever is constructed of a pair of lever bodies to be integrated into one body, and said at least one shock absorbing portion is provided at a predetermined position between a base end portion of said lever bodies around which said brake lever is rotated and a top end portion of said lever bodies.

* * * * *